United States Patent
Samoylenko

(10) Patent No.: US 7,375,852 B1
(45) Date of Patent: May 20, 2008

(54) SYSTEM AND METHOD FOR SUPPORTING A VARIETY OF COLOR SPACES IN A COMPUTER OPERATING SYSTEM

(75) Inventor: Alexander N. Samoylenko, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 939 days.

(21) Appl. No.: 10/357,532

(22) Filed: Feb. 4, 2003

(51) Int. Cl.
*G06F 15/00* (2006.01)

(52) U.S. Cl. .............. 358/1.9; 358/3.23; 358/501; 358/518; 358/519; 358/525; 382/162; 382/167

(58) Field of Classification Search .............. 358/1.9, 358/1.13, 1.15, 1.2, 2.1, 3.23, 501, 518, 519, 358/520, 521, 522, 523, 525; 382/162, 167
See application file for complete search history.

(56) References Cited

U.S. PATENT DOCUMENTS 7,072,084 B2 * 7/2006 Shirasawa ............... 358/525

2003/0043392 A1 * 3/2003 Sugimoto ............... 358/1.9
2003/0123072 A1 * 7/2003 Spronk ............... 358/1.9

* cited by examiner

*Primary Examiner*—Twyler Lamb
*Assistant Examiner*—Vu Hang
(74) *Attorney, Agent, or Firm*—Perkins Coie LLP

(57) ABSTRACT

An application program may support multiple color spaces, such as Cyan Magenta Yellow blacK (CMYK) and Red Green Blue (RGB). Many computer operating systems have graphics drawing engines that only support RGB color space. For supporting non-RGB color spaces, the application program can use a color mapping table that defines a relationship between two color spaces such as CMYK and RGB. By generating unique RGB identifiers that can be passed through a graphics drawing engine and by using escape functions of a page description language, an application program can modify a printer file written in a page description language such that a non-RGB color space such as CMYK can be supported for publishing an electronic document.

17 Claims, 9 Drawing Sheets

← 345

Application Color Mapping Table

| RGB id Range ← 350 | Unique Color Identifier ← 355 | CMYK Color ← 360 |
|---|---|---|
| (0-5, 0-5, 0-5) | 0 | [0 0 0 1] |
| (0-5, 0-5, 6-10) | 1 | [0 0 0 0.99] |
| (0-5, 0-5, 11-15) | 2 | [0 0 0 0.80] |
| ⋮ | ⋮ | ⋮ |
| (0-5, 0-5, 251-255) | 50 | [1 0 0 0] |

*FIG. 3B*

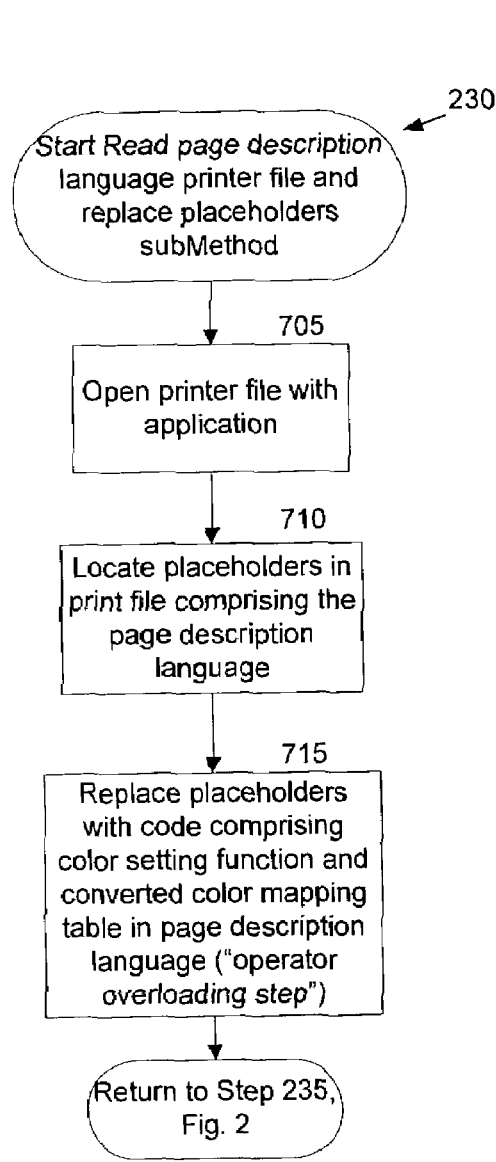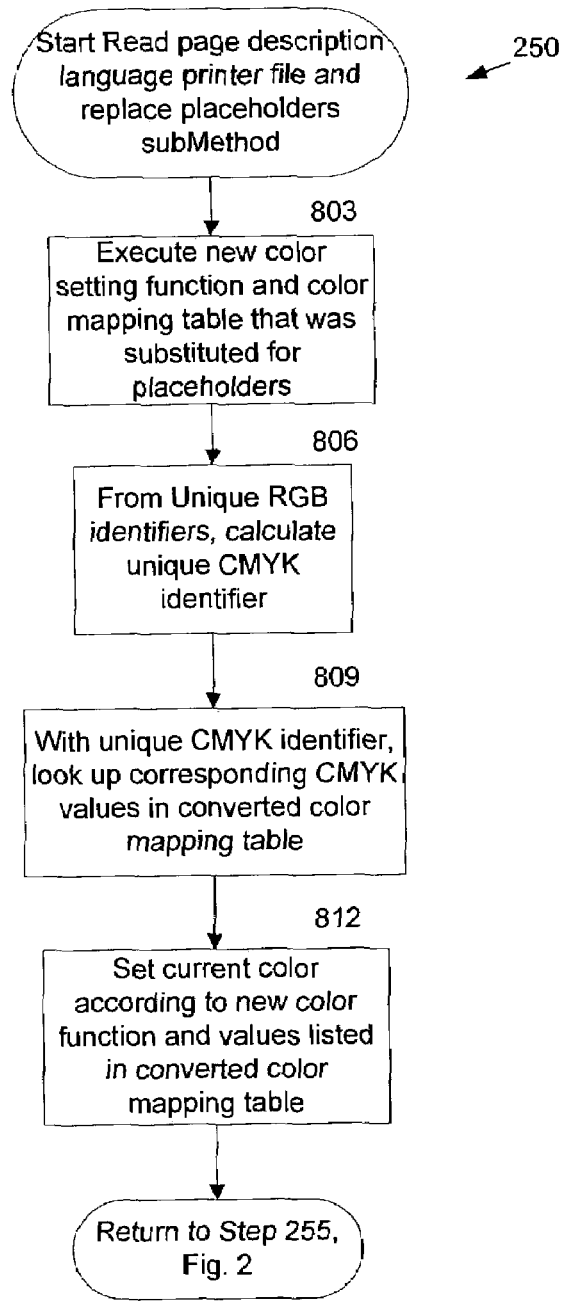
FIG. 7
FIG. 8

SYSTEM AND METHOD FOR SUPPORTING A VARIETY OF COLOR SPACES IN A COMPUTER OPERATING SYSTEM

TECHNICAL FIELD

The present invention relates to publishing electronic documents from a computer. More specifically, it relates to publishing electronic documents with colors that are usually not supported by graphics drawing engines of computer operating systems.

BACKGROUND OF THE INVENTION

Commercial printing shops usually require that electronic documents be formatted according to a page description language when printing the electronic document. Conventional page description languages include PostScript which is one of the most well known page description languages that was created by Adobe Systems. Page description languages use English like commands to control page layout and to load and scale outline fonts.

There are many color models accepted by print devices. One popular color model is called red green blue (RGB). However, in commercial printing, a color model known as cyan, magenta, yellow, black (CMYK) is the most popular.

Many computer operating systems have a graphics drawing engine that renders images and text on the computer monitor and to print devices. Many operating systems only support the RGB color model. This means that applications designed to draw and print on these operating systems will have a difficult time to display and print using the CMYK color model preferred in commercial printing Accordingly, there is a need in the art for a system and method for an application program designed for a computer operating system that uses an RGB color model for its graphics drawing engine, such as Graphics Device Interface (GDI) and GDI+ within Microsoft Windows, that can support a wide variety of non-RGB color spaces for publication of an electronic document. Specifically, there is a need in the art for a method and system that can support a wide variety of non-RGB color spaces such as CMYK, CMY, gray scale, and other types of color spaces that are usually not supported by a graphics drawing engine that is part of a computer operating system. Further, there is a need in the art for an application program that can support both RGB and non-RGB color spaces. And lastly, there is a need in the art for adding non-RGB color space functionality to a publishing program.

SUMMARY OF THE INVENTION

With the present invention, an application program operating in a computer operating system that uses one color space or model in its graphics drawing engine can support a wide variety of other color spaces for publication of an electronic document. Such color spaces can include, but are not limited to, Red Green Blue (RGB), Cyan Magenta Yellow BlacK (CMYK), Cyan Magenta Yellow (CMY), grey scale, and other types of color spaces that are usually not supported by the graphics drawing engine in computer operating systems.

The present invention in one exemplary embodiment can add non-RGB color space functionality to a publishing program even if the computer operating system does not. However, the present invention is not limited to publication programs. This color space functionality can be added to any application program that operates in a computer operating system and which uses a graphics drawing engine.

The reason why non-RGB color spaces are usually not supported by most conventional Microsoft Windows programs can be attributed to at least one reason: The graphics drawing engine within Microsoft Windows, known as GDI and GDI+, can only pass RGB color space (and not any other color space) information to the page description language printer driver.

In order to support the non-RGB and RGB color spaces, the present invention comprises an application program that can communicate with the graphics drawing engine. The graphics drawing engine can communicate with a page description language print driver such as a PostScript language print driver. To generate the non-RGB color spaces, the present invention can have the application program map RGB color space values that are usually supported by the graphics drawing engine to non-RGB color space values.

Specifically, in one exemplary embodiment, an application program can assign RGB triplet values (where each entry of the triplet can range from zero to two-hundred-fifty-five) to unique integers. That is, for each RGB triplet, a unique integer can be assigned to it. Also associated with each unique integer can be a unique CMYK color. Because there are more RGB values than CMYK colors, more than one RGB value can be assigned to a single unique identifier that is also associated with a single CMYK color. Therefore, the color mapping table formed by the application program can comprise this association between the RGB values, unique integers, and CMYK colors.

Because most conventional graphics drawing engines use only the RGB color space, the application program of the present invention can create unique RGB triplet values that are based on the unique identifiers that are present in the color mapping table. That is, when a non-RGB color space is selected for outputting an electronic document, the application program determines the CMYK color values for the objects and text being outputted. Next the application program can take these CMYK values to look up their corresponding unique integers in the color mapping table.

The application program can then take the unique integer found in the look up table and use a mathematical relationship to transform the unique integer in to a unique RGB triplet value that can be passed from the graphics drawing engine to the page description language printer driver. Using a print to file feature of the page description language printer driver, the application program can also use an escape feature of the page description language such that the graphics drawing engine passes escape commands coupled with place holders to the page description language printer driver.

These escape commands coupled with place holders passed from the graphics drawing engine to the printer driver can cause the printer driver to produce a print file comprising a page description language representation of the electronic document, where the page description language further comprises the unique RGB triplet values and the place holders passed from the graphics drawing engine that originated from the application program.

After the page description language printer driver generates the printer file, the application can transform the color mapping table to the page description language. The application program can then access the printer file and replace the place holders with the color mapping table and page description language code. The page description language code inserted by the application program into the printer file can comprise modified color functions that cause the program of the printer file to transform the unique RGB triplet values back to the unique identifier and to use this unique identifier to look up the CMYK color in the transformed color mapping table now present in the printer file. The application program can save this modified printer file or it can send it to an output device such as a printer.

BRIEF DESCRIPTION OF THE DRAWINGS

FIG. 3B illustrates an exemplary application color mapping table according to one exemplary embodiment of the present invention.

FIG. 7 illustrates an exemplary sub-method for reading the page description language file, replacing place holders in the page description application file with text and commands formatted in the page description language according to one exemplary embodiment of the present invention.

FIG. 8 illustrates a sub-method for supporting a color space that is newly defined by the code substituted for the place holders in a PostScript language printer file.

DETAILED DESCRIPTION OF EXEMPLARY EMBODIMENTS

An application program may support multiple color spaces such as CMYK and RGB. For supporting non-RGB color spaces, the application program can use a color mapping table that defines a relationship between two color spaces such as CMYK and RGB. By generating unique RGB identifiers that can be passed through a graphics drawing engine and by using escape functions of a page description language, an application program can modify a printer file written in a page description language such that a non-RGB color space such as CMYK can be supported.

Exemplary Operating Environment

Exemplary embodiments of the present invention will hereinafter be described with reference to the drawings, in which like numerals represent like elements throughout the several figures.

Figure 1:
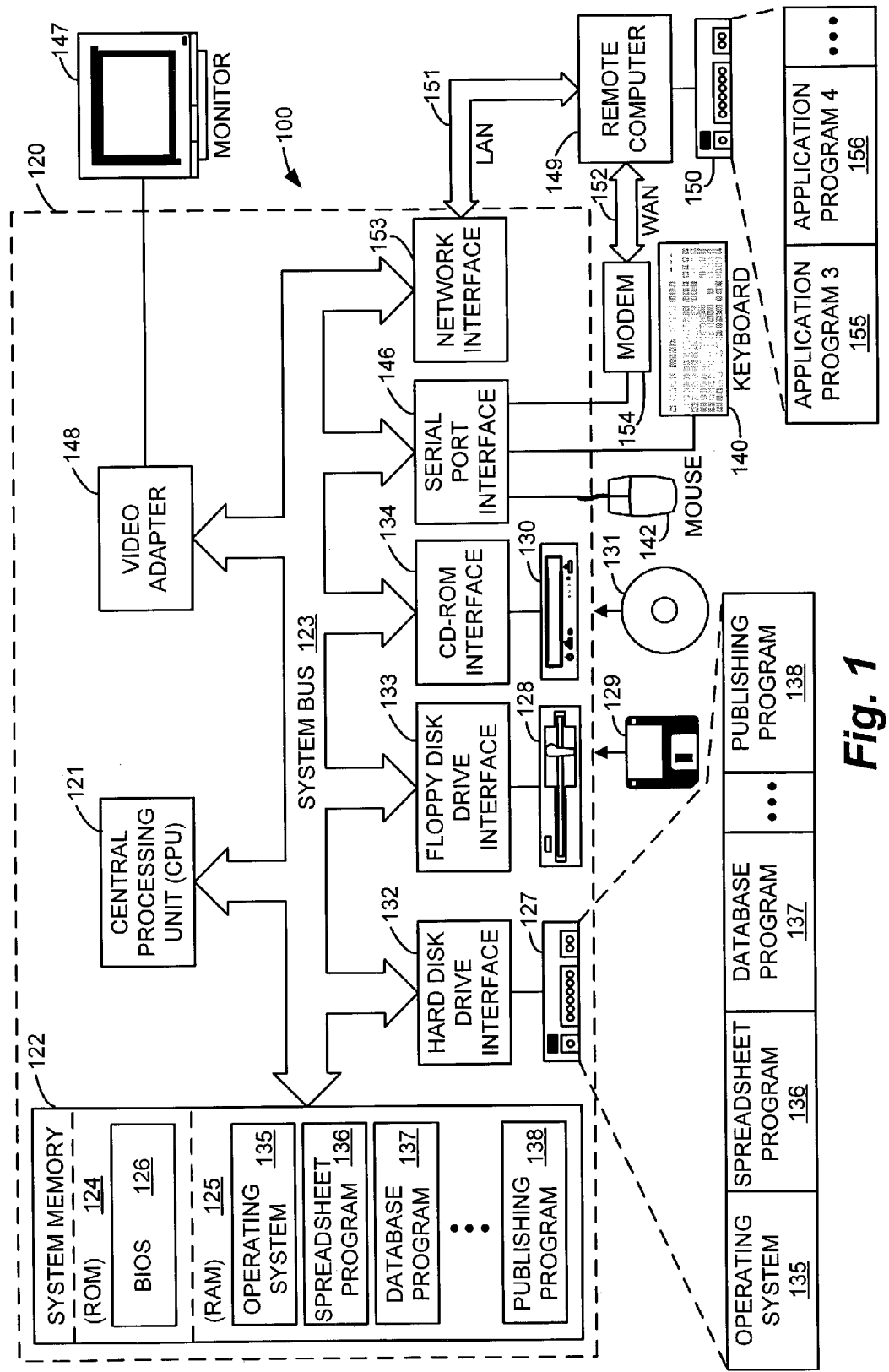
FIG. 1 illustrates exemplary software elements of the invention within a typical computer architecture supporting a windowing operating system environment.

FIG. 1 is a functional block diagram illustrating an exemplary operating environment for implementation of various embodiments of the present invention. The exemplary operating environment 100 includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within personal computer 120, such as during start-up, is stored in ROM 124.

Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or DVD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively.

Although the exemplary environment described herein employs hard disk 127, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 120.

A number of program modules may be stored on hard disk 127, magnetic disk 129, optical disk 131, ROM 124, or RAM 125, including an operating system 135, a spreadsheet program 136, a database program 137, and a work management program 138. Program modules include routines, sub-routines, programs, objects, components, data structures, etc., which perform particular tasks or implement particular abstract data types. Aspects of the present invention can be implemented to create an electronic document with a publishing program 138.

A user may enter commands and information into personal computer 120 through input devices, such as a keyboard 140 and a pointing device 142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 121 through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor 147, personal computers typically include other peripheral output devices (not shown), such as speakers and printers.

The personal computer 120 may operate in a networked environment using logical connections to one or more remote computers 149. Remote computer 149 may be another personal computer, a server, a client, a router, a network PC, a peer device, or other common network node. While a remote computer 149 typically includes many or all of the elements described above relative to the personal computer 120, only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, program modules 155, 156 or portions thereof, depicted relative to remote computer 149, may be stored in the remote memory storage device 150. It will be appreciated that the network connections shown are exemplary and other means of establishing a communications link between the computers may be used.

Moreover, those skilled in the art will appreciate that the present invention may be implemented in other computer system configurations, including hand-held devices, multi-processor systems, microprocessor based or programmable consumer electronics, network personal computers, mini-computers, mainframe computers, and the like. The invention may also be practiced in distributed computing environments, where tasks are performed by remote processing devices that are linked through a communications network. In a distributed computing environment, program modules may be located in both local and remote memory storage devices.

Exemplary Architecture

Figure 1B:
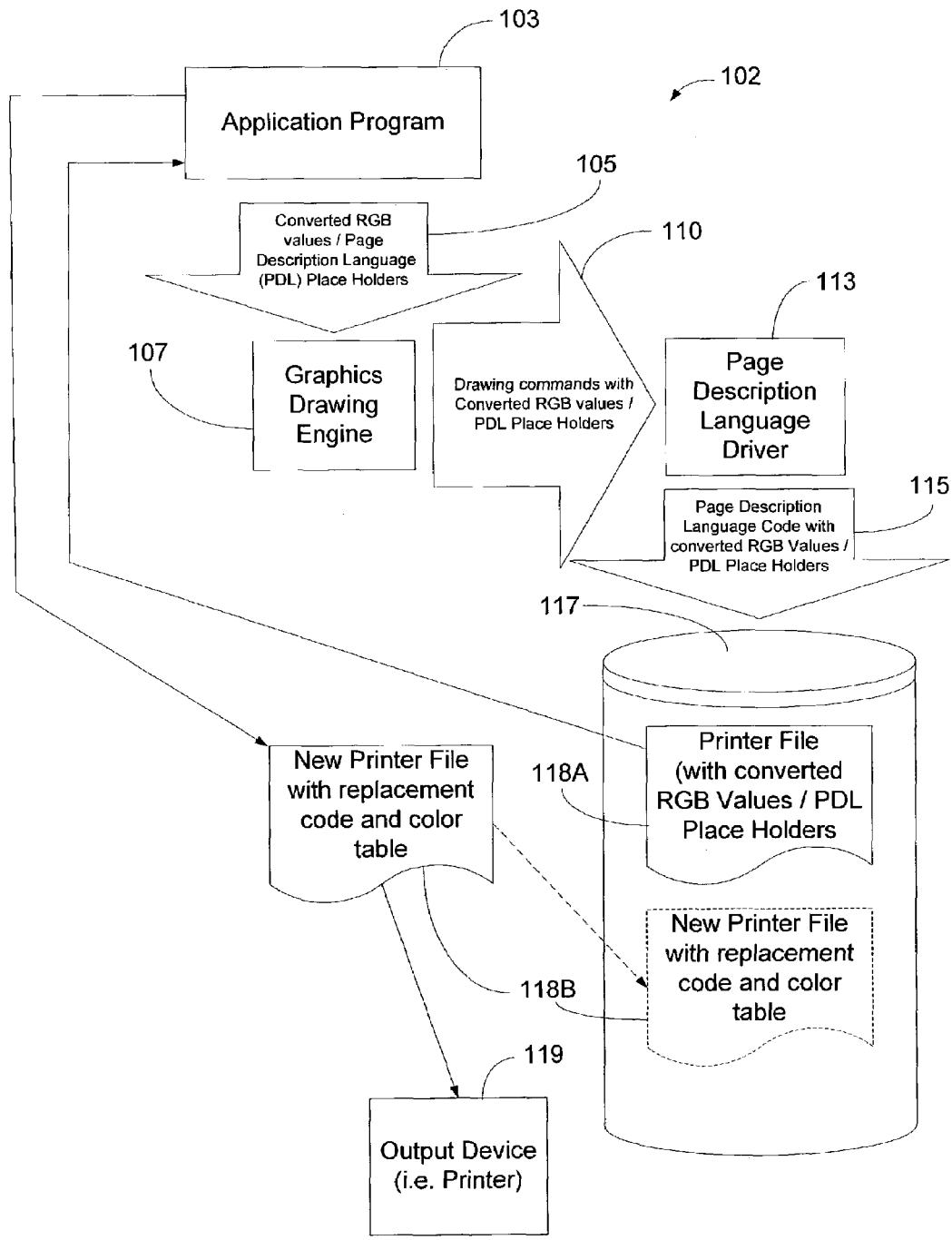
FIG. 1B illustrates exemplary software elements that may interact with one another to provide the system and method of the present invention.

Referring now to FIG. 1B, this figure illustrates an exemplary software architecture 102 that can comprise an application program 103, a graphics drawing engine 107, a page description language driver 113, a storage medium 117, and an output device 119. The present invention includes multiple computer programs which embody the functions described herein and illustrated in the exemplary architecture diagrams and the appended flow charts.

However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the exemplary architecture and flow charts and associated description in the application text, for example. Therefore, disclosure of a particular set of program code instructions is not considered necessary for an adequate understanding how to make and use the invention. The inventive functionality of the claimed computer program will be explained in more detail in the following description in conjunction with the remaining Figures illustrating the functions and program flow.

As noted above, according to one exemplary embodiment of the present invention, the application program 103 can comprise a publishing program that is designed to support outputs such as commercial printing, web publishing, desktop publishing, and other like publishing environments. The graphics drawing engine 107 can comprise a graphics display system used by applications to display or print bit-mapped text (TrueType fonts) images, and other graphical elements. The graphics drawing engine 107 is responsible for drawing dialog boxes, buttons, and other elements in a consistent style on a screen by calling the appropriate screen drivers and passing these drivers the information on an item to be drawn.

The graphics drawing engine 107 can also work with GDI printers, which have limited ability to prepare a page for printing. For other non-GDI printers, the graphics drawing engine 107 can call the appropriate printer drivers and reformat the image or document in a page description language or another printer language. Alternatively, the graphics drawing engine 107 can call the appropriate printer drivers and move an image or document directly to the printer. According to one exemplary and preferred embodiment, the graphics drawing engine 107 calls the appropriate printer drivers and reformats the image or document in a page description language such as PostScript.

The page description language driver 113 can comprise a software program designed to enable the graphics drawing engine 107 to work with an output device 119 such as a printer. The page description language driver 113 allows the graphics drawing engine 107 to not concern itself with the specifics of the output device's 119 hardware and internal language. According to one exemplary and preferred embodiment of the present invention, the page description language driver 113 comprises a PostScript (page description) language printer driver.

Those skilled in the art recognize that PostScript is a page description language from Adobe Systems that offers flexible font capability and high-quality graphics. It is one of the most well-known page-description languages and it uses English like commands to control page layout and to load and scale outline fonts. However, the present invention is not limited to the PostScript page description language. Other page description languages are not beyond the scope of the present invention.

The page description driver 113 can support a variety of color spaces. For example, exemplary color spaces supported by the page description language driver 113 can include, but are not limited to, CMYK, CMY, gray scale, RGB and other like color spaces.

The storage medium 117 can comprise a magnetic storage medium such as a hard disk drive 127, a floppy disk 129, a CD or DVD-Rom 131, random access memory (RAM) 125, and other like storage mediums. The storage medium 117 can save files such as printer files 118A and 118B as will be discussed in further detail below.

The output device 119 can comprise a printer. However, other output devices such as a monitor 147, and other like output devices that can support publishing of an electronic document are not beyond the scope and spirit of the present invention.

The application program 103 can support the creation, editing, and formatting of an electronic document. When the electronic document is desired to be published such as on a printer, and when a non-RGB color space such as CMYK is selected, the application program 103 can identify the CMYK values of the objects and text contained within the electronic document. With a color mapping table, the application program 103 can identify a unique identifier that is assigned to the current CMYK value being processed. The application program 103 can take the unique identifier associated with the CMYK color and convert the unique identifier into the set of unique RGB values that are passed to the graphics drawing engine 107. The application program 103 can also generate page description language (PDL) place holders that are also passed to the graphics drawing engine 107 as indicated by information flow arrow 105 in FIG. 1.

The graphics drawing engine 107 receives the converted RGB values and PDL place holders 105 and uses them to create drawing commands 110. The drawing commands 110 can comprise the converted RGB values and PDL place holders can then be passed to the page description language driver 113 as represented by information flow arrow 110.

The page description language driver 113 can receive the drawing commands 110 that includes the converted RGB values and PDL place holders and generate page description language code 115 based upon the converted RGB values and PDL place holders. The page description language driver 113 can create a printer file 118A comprising the page description language code 115 having the converted RGB values and PDL place holders. This printer file 118A can be saved on storage medium 117 where it can accessed by the application program 103.

The application program 103 can take the printer file 118A with the converted RGB values and PDL place holders and replace the place holders with a color function that supports the selected CMYK color space. Those skilled in the art recognize that most graphics drawing engines 107 only support the RGB color space and not any other color spaces. Further, those skilled in the art recognize that the page description language code 115 generated by the page description language driver 113 can support other color spaces but such color spaces need to be defined internally within the page description language code itself.

The application program 103 can take the printer file 118A and replace the PDL place holders with the color function noted above such that the new color space CMYK can be supported. The application program 103 also replaces the place holders with page description language commands that translate the converted RGB values back into the unique identifier that is associated with a particular CMYK color. The application program 103 also takes the color mapping table and reformats it into the page description language format.

The application program 103 can take this converted color mapping table and replace some of the place holders with this color mapping table. With the replacement code and reformatted color mapping table, the application program 103 can create a new printer file 118B that can be sent to the output device 119 or the storage medium 117.

Exemplary Method for Supporting Non-RGB Color Spaces

Figure 2:
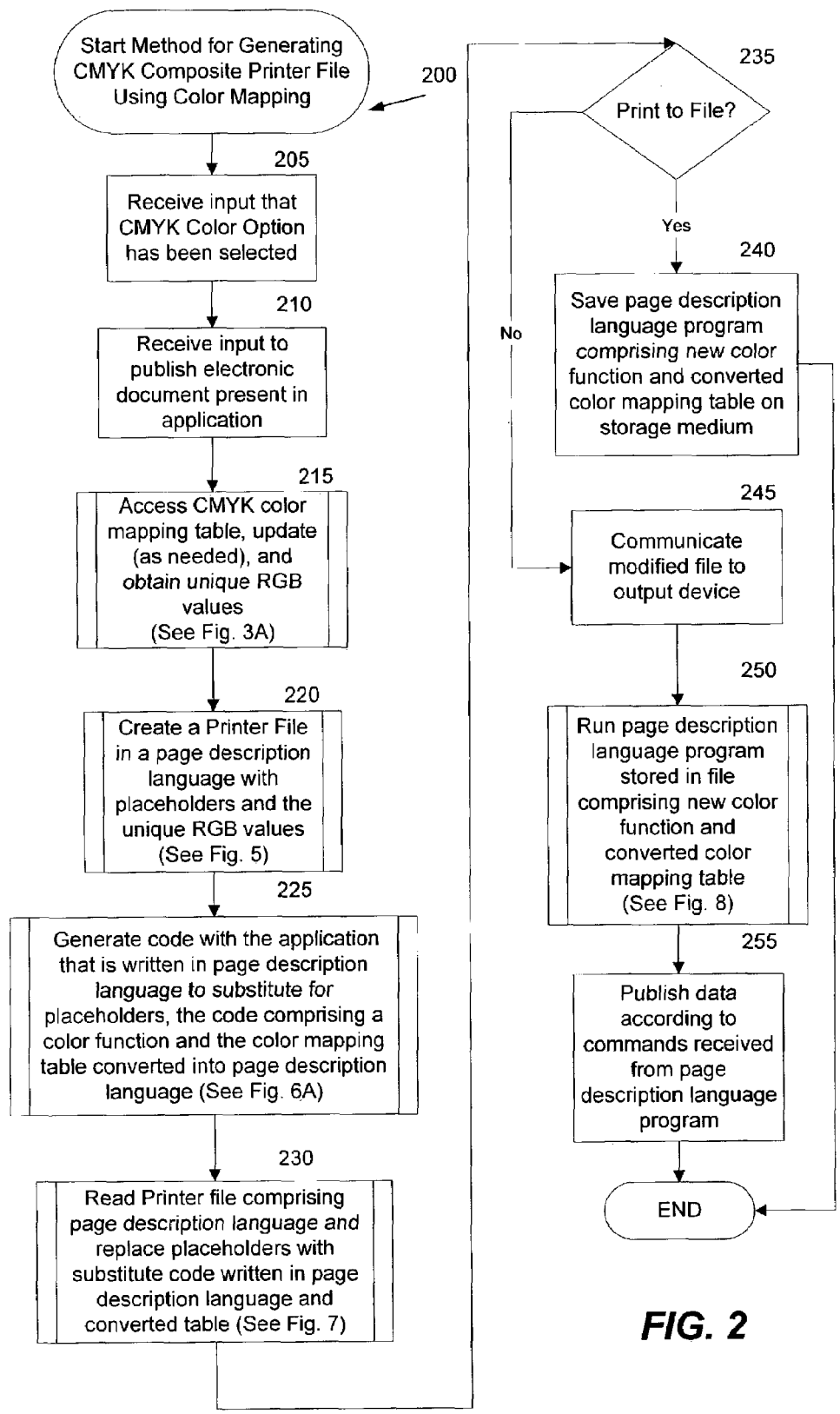
FIG. 2 illustrates an overview of a method for supporting additional color spaces for publishing according to one exemplary embodiment of the present invention.

Referring now to FIG. 2, this figure illustrates an exemplary process 200 for generating a non-RGB composite printer file using color mapping. It is noted that certain steps in the processes described below must naturally precede others for the present invention to function as described.

However, the present invention is not limited to the order of the steps described if such order or sequence does not alter the functionality of the present invention. That is, it is recognized that some steps may be performed before or after other steps or in parallel with other steps without departing from the scope and spirit of the present invention.

Step 205 is the first step in the process 200 in which input is received that a non-RGB color space, such as CMYK, has been selected for the current electronic document. Next, in Step 210 the application program 103 receives input to publish the electronic document present in the application 103 to the output device 119.

In Routine 215, the application program 103 accesses the color mapping table, updates the color mapping table as needed and obtains unique RGB values that are related to unique identifiers found in the color mapping table. Further details of Routine 215 will be discussed below with respect to FIG. 3A.

Next, in Routine 220, based upon information 105, 110 received from the application program 103 and the graphics drawing engine 107, the page description language driver 113 creates a printer file 118A in the page description language that comprises the unique RGB values and place holders. Further details of Routine 220 will be discussed below with respect to FIG. 5.

In Routine 225, the application program 103 can generate code that is written in the page description language to substitute for the place holders present and the printer file 118A. The code generated by the application program 103 can comprise a color function and the color mapping table which is converted into the page description language. Further details of Routine 225 will be discussed below with respect to FIG. 6A.

In Routine 230, the application program 103 can read the printer file 118A that comprises the page description language having the place holders and unique RGB values. In this routine, the application program 103 can replace the place holders and the printer file 118A with the aforementioned substitute code and the converted color mapping table. Further details of Routine 230 will be discussed below with respect to FIG. 7.

Next, in decision Step 235 it is determined whether the output is destined for an output device 119 or storage medium 117. If the inquiry to decision Step 235 is positive, the "yes" branch is followed to Step 240 in which the new printer file 118B comprises the replacement code and converted color mapping table is saved to the storage medium 117.

If the inquiry to decision Step 235 is negative, then the "no" branch is followed to Step 245 in which the application program 103 communicates the new or modified printer file 118B to the output device 119. In Routine 250, the output device 119 can execute or run the new printer file 118B that was modified by the application program 103 that comprises the new color function and converted color mapping table. Further details of routine 250 will be discussed below with respect to FIG. 8.

In step 255 the output device 119 publishes the electronic document according to the commands present in the page description language program of the modified printer file 118B.

Figure 3A:
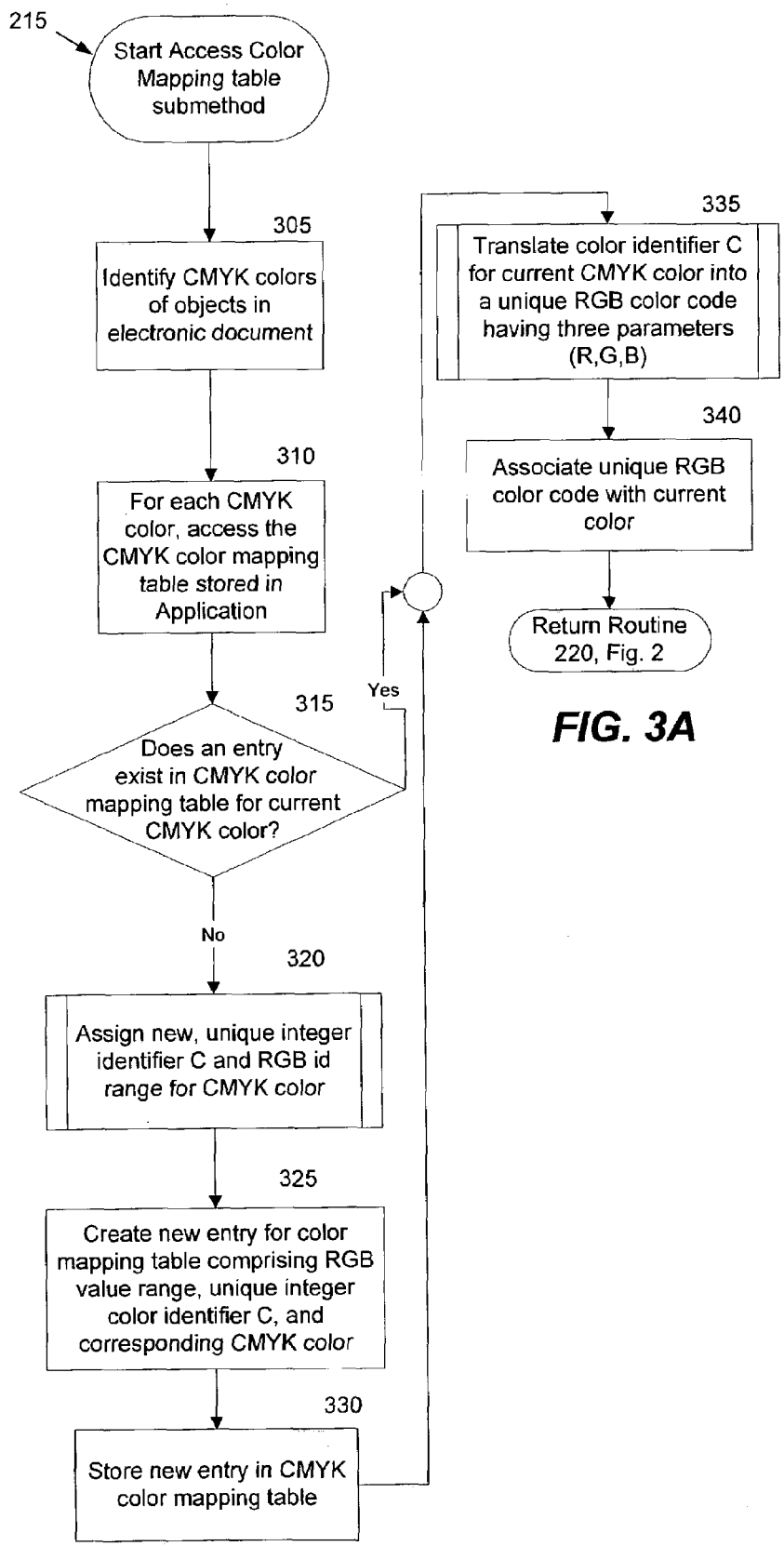
FIG. 3A illustrates a sub-method for accessing a color mapping table, updating the color mapping table as needed, and obtaining unique RGB values.

Referring now to FIG. 3A, an exemplary process or submethod 215 for accessing the color mapping table is illustrated. Routine 215 starts with step 305 in which the application program 103 identifies all of the CMYK colors of the objects and text in the current electronic document. Next, in step 310, for each CMYK color identified by the application program 103, the application program 103 accesses a CMYK color mapping table 345 (see FIG. 3B) stored in the application program 103. Further details of the CMYK color mapping table 345 will be discussed below with respect to FIG. 3B.

In decision step 315, the application program 103 determines if an entry exists in the CMYK color mapping table 345 for the current CMYK color being evaluated. If the inquiry to decision step 315 is positive then the "yes" branch is followed to routine 335. If the inquiry to decision step 315 is negative, then the "no" branch is followed to routine 320 in which a new, unique integer identifier C and an RGB identifier range are assigned for the CMYK color. Further the details of routine 320 will be discussed below with respect to FIG. 4A.

Next, in step 325, a new entry for the color mapping table 345 is created comprising the new unique integer color identifier C (made in routine 320), a range of RGB values, and a corresponding CMYK color. Subsequently, in step 330 the new entry is stored by the application program 103 in the CMYK color mapping table. In routine 335, the color identifier C obtained from the color mapping table 345 is translated into a unique RGB color code having three parameters that represent the R, G, B values (Red, Green, Blue).

The application program 103 translates the color identifier C into this unique RGB color code because the graphics drawing engine 107 cannot support any other color space than RGB values. The unique RGB color code assigned in this routine 335 can be later translated back into the single unique identifier that corresponds with the CMYK color in the color mapping table 345. Further details of routine 335 will be discussed below with respect to FIG. 4B.

In step 340 the application program 103 associates the unique RGB color code with the current color being evaluated. The process then returns to routine 220 of FIG. 2.

Referring now to FIG. 3B, an exemplary application color mapping table 345 is illustrated. This color mapping table 345 can comprise three columns where the first column 350 can comprise an RGB identifier range. A second column 355 can comprise a unique color identifier that is an integer. And a third column 360 of the table 345 can comprise a single CMYK color that is associated with the unique color identifier and the RGB identifier range. Those skilled in the art will recognize that more than one RGB color may be assigned to a single CMYK color because an RGB id range is assigned to a single unique color identifier.

An RGB ID range is assigned to a single unique identifier in order to compensate for potential calculation errors that can be made by the graphics drawing engine 107. Those skilled in the art will recognize that different graphics drawing engines 107 may transform integer values (0 to 255) to decimal fractions (0 to 1) using different algorithms. Specifically, GDI and GDI+ in Microsoft Windows will produce different decimal fraction values when starting from the same integer value.

Each entry of the CMYK color column 360 of the color mapping table 345 can comprise four values which represent fractions of Cyan, Magenta, Yellow, and BlacK. The present invention is not limited to mapping RGB values with CMYK values. Other color spaces that can be supported by the color mapping table include, but are not limited to, Cyan, Magenta, Yellow (CMY), gray scale, and other like color spaces that are usually not supported by the graphics drawing engine 107.

Figures 4A, 4B:
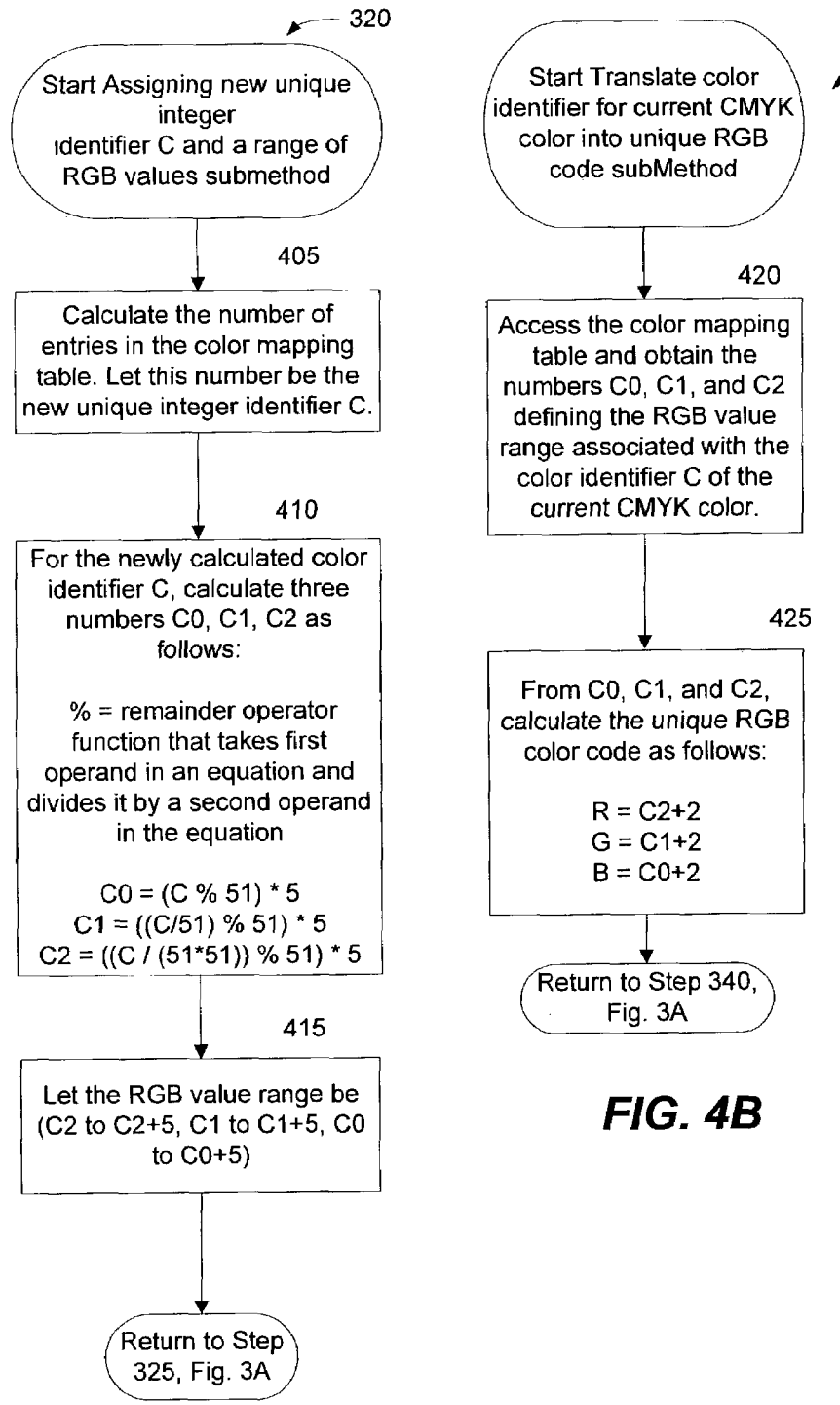
FIG. 4A illustrates a sub-method for assigning a unique integer identifier and a range of RGB values to the current CMYK color.
FIG. 4B illustrates a sub-method for translating a color identifier for a current CMYK color into a unique RGB triplet code.

Referring now to FIG. 4A, this Fig. illustrates an exemplary process or submethod 320 for assigning a new unique integer identifier C and a range of RGB values to the current CMYK color being evaluated. Routine 320 starts with step 405 in which the application program 103 calculates the number of entries in the application color mapping table 345 as illustrated in FIG. 3B. This number is assigned to the integer identifier C.

In step 410 the application program 103 calculates the numbers C0, C1, and C2 from the three different equations. The equations are as follows:

$$C0 (C \%51)*5$$

$$C1=((C/51)\%51)*5$$

$$C2=((C/(51*51))\%51)*5$$

In step 415, based on the calculated numbers C0, C1, and C2, the application program 103 defines the RGB Id range in column 350 of the color mapping table 345 that corresponds with the unique color identifier that is present in the second column 355. This range is defined as (C2 to C2+5, C1 to C1+5, C0 to C0+5). The process than returns to step 325 of FIG. 3A.

Referring to FIG. 4B, this figure illustrates an exemplary process or submethod 235 for translating the color identifier uncovered in routine 320 into a unique RGB code comprising an RGB color code triplet (three values representing Red, Blue, and Green magnitudes). Routine 335 starts with step 420 where the numbers C0, C1, and C2 are obtained from the color mapping table entry associated with the color identifier.

In step 425, from the obtained three values C0, C1, and C2, a unique RGB color code triplet can be calculated as follows:

$$R=C2+2$$

$$G=C1+2$$

$$B=C0+2$$

The process than returns to step 340 of FIG. 3A.

Figure 5:
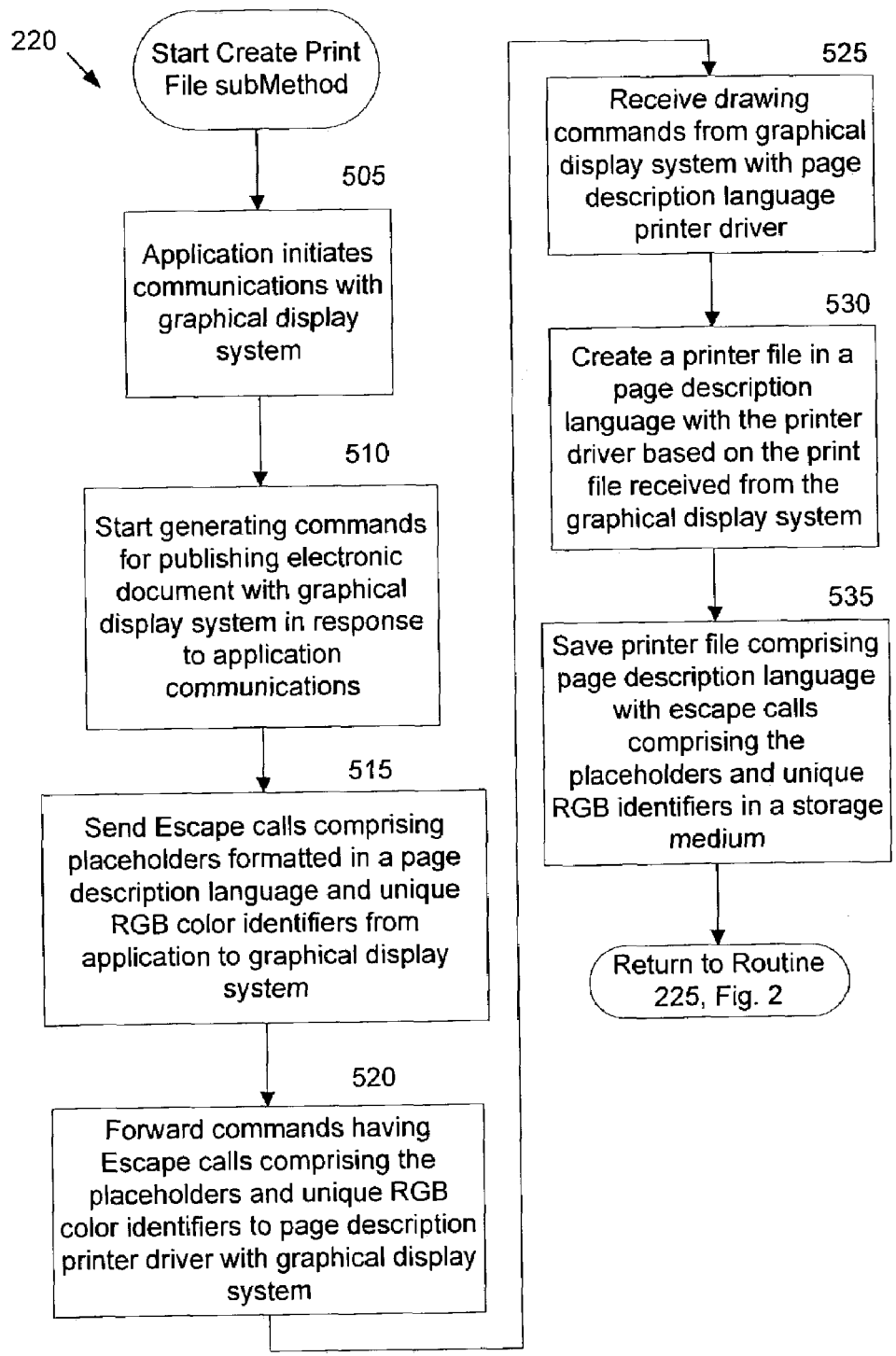
FIG. 5 illustrates an exemplary sub-method for creating a printer file formatted in a page description language according to one exemplary embodiment of the present invention.

Referring now to FIG. 5, this figure illustrates an exemplary process or submethod 220 for creating the printer file 118A with the page description language printer driver 113. This routine 220 starts with step 505 in which the application program 103 initiates communications with the graphics drawing engine 107. In step 510, the graphics drawing engine 107 can start generating drawing commands for publishing the electronic document present in the application program 103 in response to the communication 105 that the graphical drawing engine 107 receives from the application program 103.

In step 515, the application program 103 can forward an escape command 105 comprising placeholders and unique RGB color identifiers (created during routine 335 of the graphics drawing engine 107) formatted in a page description language. In one exemplary embodiment when the PostScript page description language is used, the escape command can comprise PostScript injection commands. Next, the graphical drawing engine 107 can generate drawing commands 110 having the escape calls comprising the placeholders and the unique RGB color identifiers to the page description language driver 113.

In step 525, the page description language driver 113 can receive the drawing commands from the GDI drawing 107 that comprise the placeholders and unique RGB color identifiers. In step 530 the page description language driver 113 can create a first printer file 118A based on the drawing commands received from GDI drawing 107.

In step 535, the page description language driver 113 can save the printer file 118A on the storage medium 117. The printer file 118A can comprise a page description language program having escape calls comprising the placeholders and the unique RGB triplet values. The process then returns to routine 225 of FIG. 2.

Figure 6A:
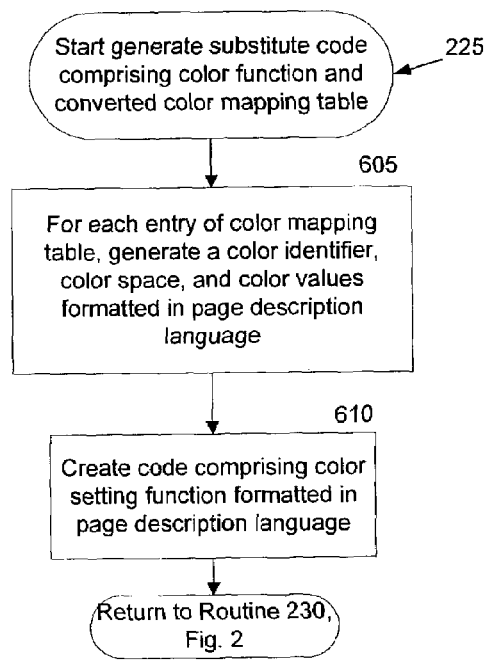
FIG. 6A illustrates an exemplary sub-method for generating substitute page description language code, a page description language formatted color function, and converting a color mapping table to the page description language.

Referring now to FIG. 6A, this figure illustrates an exemplary process or submethod where the application program 103 can generate code comprising a color function and a converted color mapping table formatted in the page description language. Routine 225 starts with step 605 in which the color mapping table 345 of the application program 103 is converted into the page description language. For each entry of the color mapping table 345, a color identifier, color space, and CMYK values are formatted in the page description language.

Specifically, in one exemplary and preferred embodiment in which PostScript language is used as the page description language, the color mapping table 345 is formatted as an array comprising a color identifier, a color space function, and the corresponding CMYK four values. Further details of this array are illustrated in FIG. 6B which will be discussed in further detail below.

In step 610, the application program 103 can create code comprising a color setting function formatted in the page description language. This code created by the application program 103 will be used to overload or redefine a color setting function the page description language that typically uses the RGB color space. The process then returns to routine 230 FIG. 2.

Figure 6B:
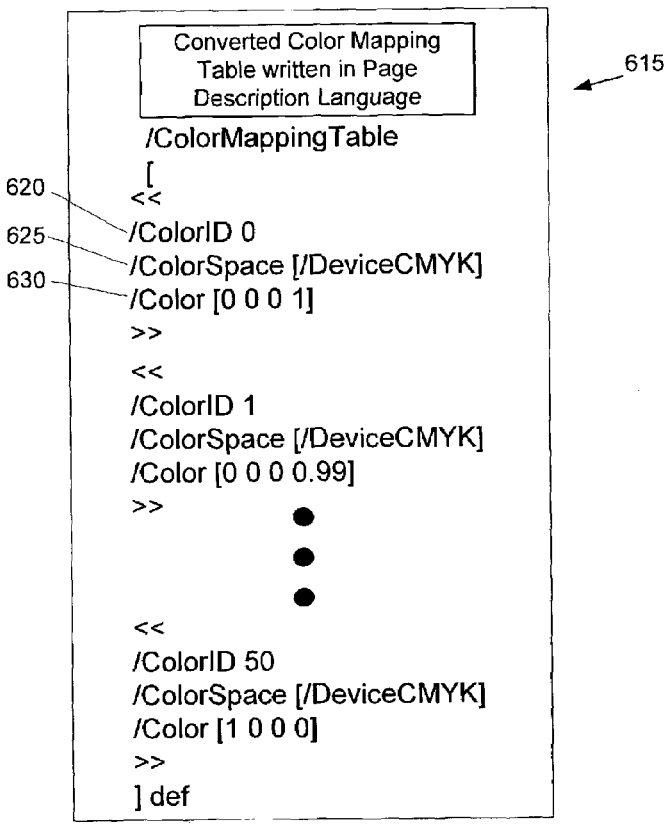
FIG. 6B illustrates an exemplary converted color mapping table written in a page description language according to one exemplary embodiment of the present invention.

Referring now to FIG. 6B, this figure illustrates an exemplary color mapping table 615 that has been written in the page description language of one exemplary embodiment of the present invention. Referring briefly back to FIG. 3B, for each entry in the color mapping table 345, there will be three values entered into the color mapping table 615 of FIG. 6B that is written in the page description language. The first value of an entry in the color mapping table 615 in FIG. 6B can comprise the unique integer color identifier of the application program color mapping table 345. The next entry in the converted color mapping table 615 can comprise a function such as "color space" that informs the page description language program which color set will be used for publishing the electronic document.

In one exemplary and preferred embodiment, the "color Space" function calls upon the CMYK color space. However, as noted above, other color spaces are not beyond the scope and spirit of the present invention. Other color spaces can include, but are not limited to, CMY, gray scale, and other color spaces which are usually not supported by the graphics drawing engine 107. The third value for each entry in the converted color mapping table 615 of FIG. 6B can comprise the color code for the particular color space being accessed. For the CMYK color space, the color code will comprise four values. In the embodiment illustrated in FIG. 6B, the third value 630 comprises four digits that include 0, 0, 0, 1. Such a value would define the color black in the CMYK color space.

Referring now to FIG. 7, this figure illustrates an exemplary process or submethod 230 for reading the page description language printer file 118A and replacing the placeholders contained therein. Routine 230 starts with step 705 in which the application program 103 opens the printer file 118A. Next, in step 710 the application program 103 locates placeholders in the printer file 118A. Next, in step 715 the application program 103 replaces the placeholders in the printer file 118A with code comprising a color setting function written in the page description language. This replaced color setting function can redefine the existing color setting function code of the page description language program. This step 315 can be referred to the art as an operator overloading step.

Also in step 715, the application program 103 can substitute other placeholders with the color mapping table. Those skilled in the art will recognize that the converted color mapping table is needed within the page description language program because the page description language program must define its color spaces within the program itself since calls cannot be made outside of the page description language program. Because of this independent nature of the new printer file 118B, it can be executed or run without any reference to the application program 103. In this way, for commercial printing applications, the printer file 118B can be accessed and reformatted or changed as necessary. The process then returns to decision step 235 of FIG. 2.

Referring now to FIG. 8, this figure illustrates an exemplary process or submethod 250 for executing the page description language program contained within the new printer file 118B. Routine 250 starts with step 803 in which the new color setting function contained within the page description language program is executed. Next, in step 806, from the unique RGB color identifiers, the page description language program can calculate the unique CMYK identifier. In step 809, with the unique CMYK identifier, the page description language program can look up the corresponding CMYK values in the converted color mapping table that is now present in the page description language program.

In step 812, the current color being processed can be set according to the new color function and the values from the converted mapping table in the page description language program. The process then returns to step 255 of FIG. 2.

With the present invention, an application program designed for a computer operating system and which uses a graphical drawing interface (GDI) can support a wide variety of non-RGB color spaces for publication of an electronic document. The method and system of the present invention supports a wide variety of non-RGB color spaces such as CMYK, CMY, gray scale, and other types of color spaces that are usually not accessible with a graphical drawing interface that is part of a computer operating system. An application program with the present invention supports both RGB and non-RGB color spaces.

It should be understood that the foregoing relates only to illustrative embodiments of the present invention, and that numerous changes may be made therein without departing from the spirit and scope of the invention as defined by the following claims.

What is claimed is:

1. A method for supporting color spaces for publishing an electronic document comprising:
   receiving a command to output an electronic document in a first color space, the electronic document comprising color values of the first color space;
   generating a color mapping to map the color values of the electronic document from the first color space to color values of a second color space, wherein a single color value of the first color space is mapped to a range of color values of the second color space;
   converting each color value of the first color space of the electronic document into a color value of a second color space using the color mapping;
   providing the color values of the second color space and place holders to a graphics drawing engine that supports the second color space but not the first color space;
   creating by the graphics drawing engine drawing commands, the drawing commands comprising the color values of the second color space and the place holders as provided;
   receiving by a page description language print driver the drawing commands from the graphics drawing engine;

creating by the page description language print driver a first printer file in a page description language that represents the electronic document, the first printer file comprising the color values of the second color space and the place holders as indicated by the received drawing commands, the first printer file having a first color setting function that indicates that electronic documents are to be rendered in the second color space;

accessing the first printer file created by the page description language driver and creating a second printer file based on the first printer file, the second printer file created by substituting the place holders of the first printer file with the color mapping and a second color setting function, the second color setting function indicating that the electronic document is to be rendered in the first color space using the color mapping, the second color setting function used to override the first color setting function of the first printer file; and rendering the second printer file in the first color space according to the second color setting function of the second printer file, wherein the color mapping is used to convert the color values of the second color space of the second printer file to color values of the first color space.

2. The method of claim 1, wherein the color mapping is a color mapping table that is used to determine a relationship between the first color space and the second color space.

3. The method of claim 1, wherein the color mapping of second printer file is a second color mapping table, the method further comprising:

creating a first color mapping table; and creating the second color mapping table by transforming the first color mapping table, the second color mapping table for substituting the place holders.

4. The method of claim 3, wherein transforming the first color mapping table comprises formatting the first color mapping table into the page description language.

5. The method of claim 1, wherein creating by the page description language print driver the first printer file in the page description language further comprises creating the print file in a PostScript page description language.

6. The method of claim 1, wherein creating by the page description language print driver the first printer file in the page description language comprises creating the print file in a PostScript page description language and using PostScript injection commands.

7. A computer system for outputting documents in a first color space, comprising:

a processing unit;

a memory storage device; and a program stored in the memory storage device for providing instructions to the processing unit, the processing unit responsive to the instructions of the program, operable for:

converting values of a first color space of an electronic document to values of a second color space using a color mapping;

providing the values of the second color space and place holders to a graphics drawing engine that supports the second color space but not the first color space;

communicating from the graphics drawing engine to a print driver drawing commands that include values of the second color space and the place holders;

creating by the print driver a printer file that represents the electronic document, the printer file comprising the values of the second color space and the place holders;

substituting the place holders of the printer file with the color mapping; and converting the values of the second color space of the printer file created by the print driver into values of the first color space using the color mapping so that the electronic document can be rendered by a device that supports the first color space even though the graphics drawing engine does not support the first color space.

8. The computer system of claim 7, wherein the printer file has a first color setting function that indicates that electronic documents are to be rendered in the second color space, and wherein the processing unit is operable for substituting the place holders of the printer file with a second color setting function, the second color setting function indicating that the electronic document is to be rendered in the first color space using the color mapping, the second color setting function used to override the first color setting function.

9. The computer system of claim 7, wherein the processing unit is operable for creating a second printer file based on the printer file created by the print driver, the second printer file created by substituting the values of the second color space are substituted for the place holders.

10. A computer system comprising:

an application program for:

generating a color mapping to map color values of a first color space to color values of a second color space, wherein a single color value of the first color space is mapped to a range of color values of the second color space, converting each color value of the first color space of an electronic document to a color value of the second color space using the color mapping, and generating place holders;

a graphics drawing engine that supports the second color space but not the first color space, the graphics drawing engine for generating drawing commands that represents the electronic document in the second color space and includes the place holders;

a printer driver for generating a printer file that represents the electronic document in the second color space and includes the place holders, the printer file having a first color setting function that indicates that electronic documents are to be rendered in the second color space; and a component for accessing the printer file to substitute the place holders with the color mapping and a second color setting function, the second color setting function indicating that the electronic document is to be rendered in the first color space using the color mapping, the second color setting function used to override the first color setting function, so that when the printer file is rendered, the color values of the second color space of the printer file are converted to color values of the first color space in accordance with the second color setting function and the substituted color mapping.

11. The computer system of claim 10, further comprising an output device for publishing the electronic document.

12. The computer system of claim 10, wherein the output device comprises one of a printer or a screen display.

13. The computer system of claim 10, wherein the place holders comprise injection commands of the PostScript page description language.

14. The computer system of claim 10, wherein the application program converts RGB values into a unique triplet that corresponds with a color mapping table.

15. The computer system of claim 10, wherein the printer file is received by a storage medium, and wherein the printer file comprises a PostScript formatted printer file.

16. The computer system of claim 10, wherein the first color space comprises CMYK and the second color space comprises RGB.

17. The method of claim 1, wherein providing the color values of the second color space and the place holders to the graphics drawing engine comprises providing escape commands to the graphics drawing engine, the escape commands comprising the color values of the second color space and the place holders.

* * * * *

UNITED STATES PATENT AND TRADEMARK OFFICE
CERTIFICATE OF CORRECTION

| | | |
|---|---|---|
| PATENT NO. | : 7,375,852 B1 | |
| APPLICATION NO. | : 10/357532 | |
| DATED | : May 20, 2008 | |
| INVENTOR(S) | : Alexander N. Samoylenko | |

It is certified that error appears in the above-identified patent and that said Letters Patent is hereby corrected as shown below:

In column 14, line 28, in Claim 9, after "space" delete "are substituted".

Signed and Sealed this
Twenty-second Day of February, 2011

David J. Kappos
*Director of the United States Patent and Trademark Office*